May 7, 1963 W. STROHMEIER ET AL 3,089,035

ELECTRICAL PULSE PRODUCING APPARATUS

Filed Jan. 28, 1959

INVENTORS
DAVID SHANSKY
WALTER STROHMEIER

BY Henry L. Hanson

ATTORNEY

3,089,035
ELECTRICAL PULSE PRODUCING APPARATUS

Walter Strohmeier, Newton Highlands, and David Shansky, South Lincoln, Mass., assignors to Minneapolis-Honeywell Regulator Company, Minneapolis, Minn., a corporation of Delaware Filed Jan. 28, 1959, Ser. No. 789,547
9 Claims. (Cl. 307—88)

Figure 1:
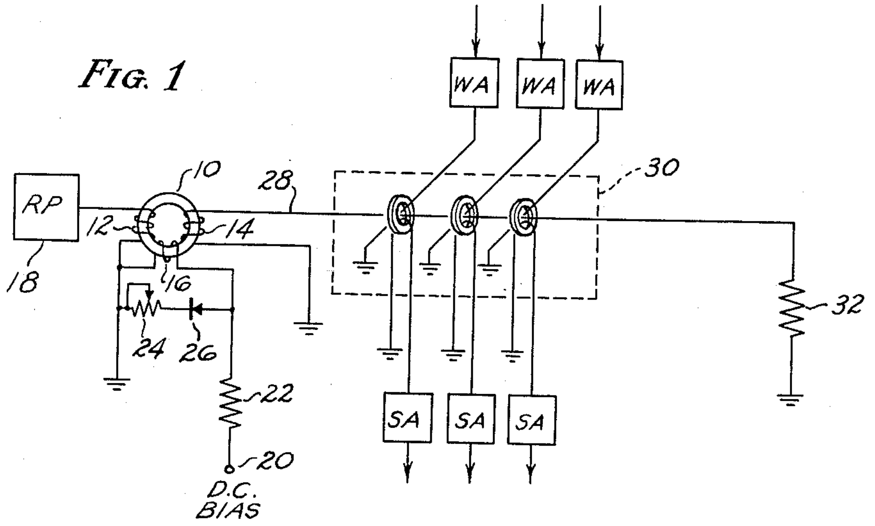

A general object of the present invention is to provide a new and improved electrical pulse producing and switching circuit which is readily adapted for use with a load requiring positive and negative output pulses having different characteristics. More specifically, the present invention is concerned with an electrical pulse producing circuit which is adapted to produce electrical pulses for use with bistable memory elements having rectangular hysteresis characteristics.

The present invention is particularly adapted for use with digital data storage mechanisms of the type employing ferrite cores as data storage or memory elements. The ferrite core is basically a bistable magnetic device having a substantially rectangular hysteresis characteristic. Core devices of this type are adapted to be insensitive to switching signals supplied thereto providing the amplitude of the switching signal is less than a predetermined amount. If, however, a current signal is passed through a winding on the core, the core will switch from one bistable state to the other and in switching will produce a signal in an output winding coupled to the core element.

It is known in the art to arrange a plurality of ferrite cores in a three-dimensional matrix for purposes of storing digital data. When arranged in a three-dimensional matrix, there are different ways in which digital data may be selected from the matrix. Generally, the data selected from the matrix will be all of the core elements arranged in a particular column and row in each of a plurality of planes in the matrix. The selection of any particular row and column may well be by way of a coincident current selection scheme. Another method of selection known in the art is sometimes termed the end-fire selection, wherein all of the cores in a particular position in the matrix have a wire passing thereto to which is applied a signal pulse of sufficient amplitude to switch any core which has been previously switched to a predetermined state. It is this latter type of circuitry to which the present invention is particularly adapted for use, although it will be apparent that it may be applied to other circuitry.

It is accordingly a further object of the invention to provide a new and improved electrical pulse producing circuit which is adapted for use with a memory of the type having end-fire selection.

One of the features of an end-fire type memory is the ability of the memory elements to be switched at very rapid rates, particularly for purposes of readout. The reason for this is that in the end-fire memory circuits, the only core devices which receive a readout pulse are the cores in the particular row selected. This means that a very sharp, high amplitude pulse may be applied so that the core device can be switched in a fraction of a microsecond. However, when it is desired to write something into the core, the write signals must be closely controlled, and these signals must cooperate with a write signal source so that if there is a half-select current from the data write signal source and also from the write-selection source, the core associated therewith will be appropriately switched. By putting the write operation on a coincident current basis, the amount of time required for switching the cores is increased since the amplitude of the signal must be closely regulated and limited from the amplitude of the read signal.

In order to provide the desired high amplitude read signal and the relatively low amplitude write selection signal with a greater time duration, the present invention discloses a new and novel magnetic core type switch which incorporates a unidirectional loading circuit which is adapted to be ineffective when the core is switched in one direction and provide a closely regulated load for the core when it is switched in the opposite direction. This greatly enhances the ability of the core device to produce the ideal pulse required for an end-fire type of memory.

It is therefore a further object of the invention to provide a new and improved magnetic core pulse producing circuit which incorporates therewith the unidirectional load which is adapted to closely regulate the output of the core when it is switched in one direction, and be effectively decoupled from the core when it is switched in the opposite direction.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
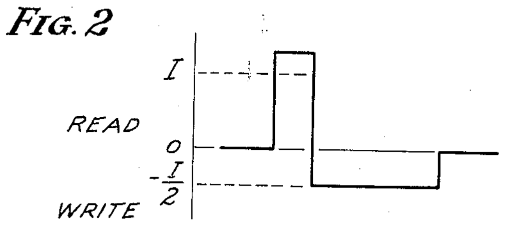

Of the drawings:

FIGURE 1 is a diagrammatic representation of a preferred form of the invention; and FIGURE 2 illustrates a representative wave form produced by the switching circuitry of FIGURE 1.

Referring first to FIGURE 1, the numeral 10 identifies a bistable magnetic core element or device having an input winding 12, an output winding 14, and a biasing winding 16. Connected to the input winding 12 is a read pulse source 18. Connected to the biasing winding 16 is a suitable high impedance current source comprising a terminal 20 which is adapted to be connected to a direct current potential source and a relatively high resistance 22. Connected in shunt with the biasing winding 16 is a unidirectional load which comprises a resistor 24, and a diode 26.

The output winding 14 is connected to a select wire 28 which passes through a plurality of ferrite core devices in a memory circuit indicated generally at 30. The select lead or wire 28 passes through each of the indicated core devices in the memory 30 and then to a resistor 32 which may be used to regulate the current flowing through the select wire 28.

Also associated with each of the plurality of core devices in the memory 30 is a write amplifier WA whose output is adapted to pass through a write wire extending through the respective memory core device. Also coupled to each of the plurality of the core devices in the memory 30 is a sense winding which is directly coupled to a sense amplifier SA.

Considering the operation of the circuitry of FIGURE 1, it is first assumed that the circuitry is in the quiescent state with no pulse being applied by way of the read pulse source 18. Under these conditions, the direct current biasing source connected to the terminal 20 will be effective to produce the switching of the core 10 to a reset state. The current flow may be traced from the terminal 20 through the resistor 22 and winding 16, to the ground terminal. The core device 10 will remain switched to this reset state until such time as an input signal is applied to the winding 12. While in the reset state, the output winding 14 will have no signal thereon and consequently, there will be no signal on the select wire 28 to affect the electrical status of any of the core devices in the memory 30.

As soon as a signal appears at the read pulse source 18, this signal will switch the core 10 from the reset state to the set state, and this switching will take place very rapidly, providing the read pulse applied to the winding 12 is of sufficient amplitude. The switching of the core 10 from the reset to the set state will produce a signal on the output winding 14, whose amplitude will be greater than the amplitude necessary for switching the memory cores of the memory 30 so that any core which previously had information set or stored therein will be switched by this read pulse and a signal will be produced in the respective sense amplifiers SA.

As viewed in FIGURE 2, the read signal for the memory 30 will have an amplitude greater than the full select signal designated I. With this large read signal, the core elements of the memory may be rapidly switched to the reset state. In one form of the invention, it was found that the switching of these cores with this type of high amplitude read pulse on the wire 28 will produce a readout in a fraction of a microsecond.

Immediately after the occurrence of the read pulse, it is desired to determine whether or not further information should be written into the memory elements of the memory 30. If information is to be written into any of the plurality of core elements in the memory 30, the associated write amplifier WA will have on the output thereof a negative half-select current $$\frac{-I}{2}$$

applied to the associated write winding. At the same time, the output winding 14 of the core 10 will have thereon a negative half-select current which will be effective, when added to any negative half-select current from the associated write amplifier, to switch the associated memory element to the set state.

It is essential that the negative half-select current produced by the core 10 be a closely regulated pulse, both as to amplitude and as to time duration. Inasmuch as the amount of current available for switching the core is less, it will be apparent that it will take a longer time for the core to switch. In order to produce this increased time length, as well as a regulated output signal, the necessary regulation of the write pulse is produced by the unidirectional load formed by the adjustable resistor 24 and the diode 26 which, with the winding 16, form a closed series circuit.

When the read pulse source 18 applies a signal to the winding 12, the switching of the core 10 will tend to produce a signal in both of the windings 14 and 16. However, due to the presence of the diode 26, this diode acts as a high impedance so that there is substantially no loading of the core device 10 due to this unidirectional loading circuit. However, when the biasing source is resetting the core 10, a signal will be induced in both the windings 14 and 16 and, in this instance, the impedance of the diode 26 will be relatively low so that the rate at which the core can switch will be decreased. By adjusting the resistor 24, the amplitude of the write pulse of the output winding 14 may be appropriately regulated. Also, the time length may be regulated. In this way, the half-select current required for the core devices of the memory 30 may be carefully controlled so that only those cores, during the write operation, which receive signals from the associated write amplifiers WA will be switched.

While the present invention has been described as being particularly adapted for use with an end-fire memory, it will be apparent that the principles thereof may well be applied to other types of pulse circuits wherein asymmetrical wave shapes are required in the utilization circuitry.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure Letters Patent is:

1. A magnetic core switch comprising a bistable magnetic core, an input winding on said core adapted to receive an input pulse of predetermined polarity tending to switch said core device in a first direction, a biasing winding on said core, a biasing signal source connected to said biasing winding and being adapted to switch said core in a second direction, an output winding on said core, a symmetrical load connected directly to said output winding, and unidirectional loading means electrically coupled to said core to delay the switching of said core when the switching is in one sense, and not delay the switching when the switching is in the opposite sense.

2. A magnetic core switch comprising a bistable magnetic core, an input winding on said core adapted to receive an input pulse of predetermined polarity tending to switch said core device in a first direction, a biasing winding on said core, a biasing signal source connected to said biasing winding and being adapted to switch said core in a second direction, an output winding on said core, a load circuit continuously connected to said output winding to receive all output signals from said output winding, and unidirectional loading means electrically coupled to said core to delay the switching of said core when the switching is in one sense, and not delay the switching when the switching is in the opposite sense, said loading means comprising a resistor and a diode connected in series.

3. A magnetic core switch comprising a bistable magnetic core, an input winding on said core adapted to receive an input pulse of predetermined polarity tending to switch said core device in a first direction, a biasing winding on said core, a biasing signal source connected to said biasing winding and being adapted to switch said core in a second direction, an output winding on said core, a load circuit continuously connected to said output winding to receive all output signals from said output winding, unidirectional loading means including a first resistor coupled to said core to delay the switching of said core when the switching is in one sense, and not delay the switching when the switching is in the opposite sense, a second resistor connected in series with said biasing signal source, a third resistor connected in series with said output winding, said second resistor having a resistance greater than the resistance of said first and third resistor.

4. A pulse producing circuit comprising a bistable core device, an input winding on said core device, an output winding on said core device, a biasing winding on said core device, a first load symmetrically connected to said output winding, a signal source adapted to be connected to said input winding to switch the bistable state of said core device to a first bistable state, a biasing source connected to said biasing winding tending to switch the bistable state of said core device to a second bistable state, and a unidirectional load electrically connected to one of said windings to impede conditionally the switching of said core device in one direction.

5. A pulse producing circuit comprising a bistable core device, an input winding on said core device, an output winding on said core device, a first load symmetrically connected to said output winding, biasing winding on said core device, a signal source adapted to be connected to said input winding to switch the bistable state of said core device to a first bistable state, a high impedance current source connected to said biasing winding tending to switch the bistable state of said core device to a second bistable state, and a unidirectional load comprising a series connected diode and resistor connected in shunt with said biasing winding to impede conditionally the switching of said core device in one direction.

6. A pulse producing circuit comprising a bistable core device, an input winding on said core device, an output winding on said core device, a first load symmetrically connected to said output winding, a biasing winding on said core device, a signal source adapted to be connected to said input winding to switch the bistable state of said core device to a first bistable state, a direct current biasing source continuously connected to said biasing winding tending to switch the bistable state of said core device to a second bistable state, a first resistor connected in series with said biasing winding, a unidirectional load connected to said biasing winding to impede conditionally the switching of said core device in one direction, said unidirectional load having a second resistor in series therewith whose resistance magnitude is less than the resistance of said first resistor.

7. A switch for an end-fire core memory comprising a magnetic core having an input winding, an output winding, and a loading winding, a symmetrical load directly connected to said output winding and comprising a select line in a memory, a current source connected to said loading winding to switch said core to a reset state, a unidirectional load electrically connected to said loading winding to limit the current in said output winding to less than that required for switching a core in said memory when switching to said reset state, and a pulse source connected to said input winding to switch said core to said set state, said output winding when said core is switched to said set state having an output in excess of that required to switch a core in said memory.

8. A switch for a magnetic core memory comprising a switching core having an input winding, an output winding, and a loading winding, a symmetrical load directly connected to said output winding and comprising a select line in a memory, a current source connected to said loading winding to switch said switching core to a reset state, a unidirectional load electrically connected to said loading winding to limit the current in said output winding to less than that required for switching a core in said memory, and a pulse source connected to said input winding to switch said core to said set state, said output winding when said switching core is switched to said set state having an output in excess of that required to switch a core in said memory.

9. An end-fire core memory switch comprising a magnetic core having an input winding, an output winding, a symmetrical load directly connected to said output winding and comprising a select line in a memory, and a loading winding, a current source connected to said loading winding to switch said core to a reset state, a unidirectional load comprising a resistor and a diode electrically connected to said loading winding to limit the current in said output winding to less than that required for switching a core in said memory, and a pulse source connected to said input winding to switch said core to said set state, said output winding when said core is switched to said set state having an output in excess of that required to switch a core in said memory.

References Cited in the file of this patent

UNITED STATES PATENTS

| | | |
|---|---|---|
| 2,708,722 | An Wang | May 17, 1955 |
| 2,776,419 | Rajchman et al. | Jan. 1, 1957 |
| 2,801,344 | Lubkin | July 30, 1957 |
| 2,805,409 | Mader | Sept. 3, 1957 |
| 2,812,450 | Barney | Nov. 5, 1957 |
| 2,874,372 | Wesslund et al. | Feb. 12, 1959 |
| 2,881,331 | Alexander | Apr. 7, 1959 |
| 2,892,998 | Eckert et al. | June 30, 1959 |
| 2,901,636 | Torrey et al. | Aug. 25, 1959 |
| 2,901,735 | Lawrence | Aug. 25, 1959 |
| 2,958,855 | Froggatt et al. | Nov. 1, 1960 |
| 2,960,684 | Auerbach | Nov. 15, 1960 |